(12) United States Patent
Gong (10) Patent No.: US 9,186,961 B2
(45) Date of Patent: Nov. 17, 2015

(54) SUNSHADE HOLDING STRUCTURE (71) Applicant: CREATIVE & COOPERATIVE INTERNATIONAL, INC., Taipei (TW)

(72) Inventor: Jing-Shyong Gong, Taipei (TW)

(73) Assignee: CREATIVE & COOPERATIVE INTERNATIONAL, INC., Taipei (TW)

( * ) Notice: Subject to any disclaimer, the term of this patent is extended or adjusted under 35 U.S.C. 154(b) by 154 days.

(21) Appl. No.: 14/030,306

(22) Filed: Sep. 18, 2013

(65) Prior Publication Data
US 2015/0075736 A1    Mar. 19, 2015

(51) Int. Cl.
*B60J 1/08* (2006.01)
*B60J 1/20* (2006.01)

(52) U.S. Cl.
CPC .............. *B60J 1/2011* (2013.01); *B60J 1/085* (2013.01)

(58) Field of Classification Search
USPC ............ 160/105, 370.21, 369, 377, 392, 395; 24/303; 248/206.5, 309.4
IPC ........................................................ B60J 1/085
See application file for complete search history.

(56) References Cited

U.S. PATENT DOCUMENTS

| | | | | |
|---|---|---|---|---|
| 2,964,812 A | * | 12/1960 | Cook | 24/10 R |
| 4,103,728 A | * | 8/1978 | Burdette et al. | 160/368.1 |
| 4,561,223 A | * | 12/1985 | Gold et al. | 52/202 |
| 6,073,675 A | * | 6/2000 | Dannaher | 160/369 |
| 7,131,683 B1 | | 11/2006 | Gong | |
| 7,699,277 B2 | * | 4/2010 | Bagnall | 248/206.5 |
| 7,748,433 B2 | * | 7/2010 | Huang | 160/370.21 |
| 8,037,923 B2 | * | 10/2011 | Alkhoury et al. | 160/369 |
| 8,365,799 B2 | | 2/2013 | Harris | |
| 2009/0091154 A1 | * | 4/2009 | Gong | 296/97.9 |

* cited by examiner

*Primary Examiner* — David Purol
(74) *Attorney, Agent, or Firm* — Muncy, Geissler, Olds & Lowe P.C.

(57) ABSTRACT

A sunshade holding structure comprises a flexible frame, a sunshade cloth and at least one positioning member. The flexible frame has at least one notch on the circumference thereof. The sunshade cloth covers the flexible frame to form a sunshade. The positioning member has two flanges extended towards the sunshade, a latch groove formed between the flanges to latch on the notch of the flexible frame, and a housing compartment opposite to the latch groove to hold a magnetic element. The positioning member is latched on one side of the notch of the flexible frame and turned to align with the circumference of the flexible frame so that the positioning member can be held securely on the flexible frame. Moreover, the magnetic element of the positioning member also attracts the inner side of a vehicle window frame to form secure positioning. Installation and disassembly also can be done quickly.

7 Claims, 10 Drawing Sheets

SUNSHADE HOLDING STRUCTURE

FIELD OF THE INVENTION

The present invention relates to a sunshade structure and particularly to a sunshade holding structure attached to an inner side of a vehicle window frame through magnetic elements to block sunshine.

BACKGROUND OF THE INVENTION

A wide variety of vehicle sunshades are now available on the market. They generally can be divided in 1: Attaching to the vehicle window via a plurality of suckers; 2: Attaching to the vehicle window via static electricity; and 3: Latching flanges extended from the circumference of the sunshade on corresponding notch components of the vehicle window. They all aim to facilitate fast and easy installation and disassembly of the sunshade when in use.

Figure 1:
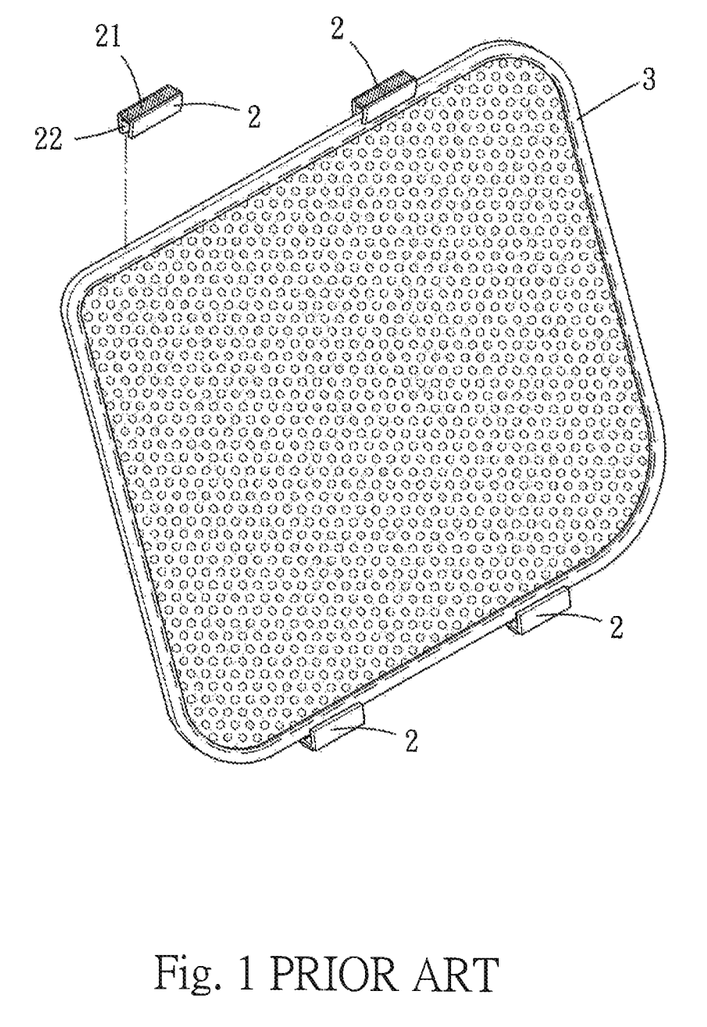
FIG. 1 is an exploded view of the sunshade holding structure of a first conventional technique.
Figure 2:
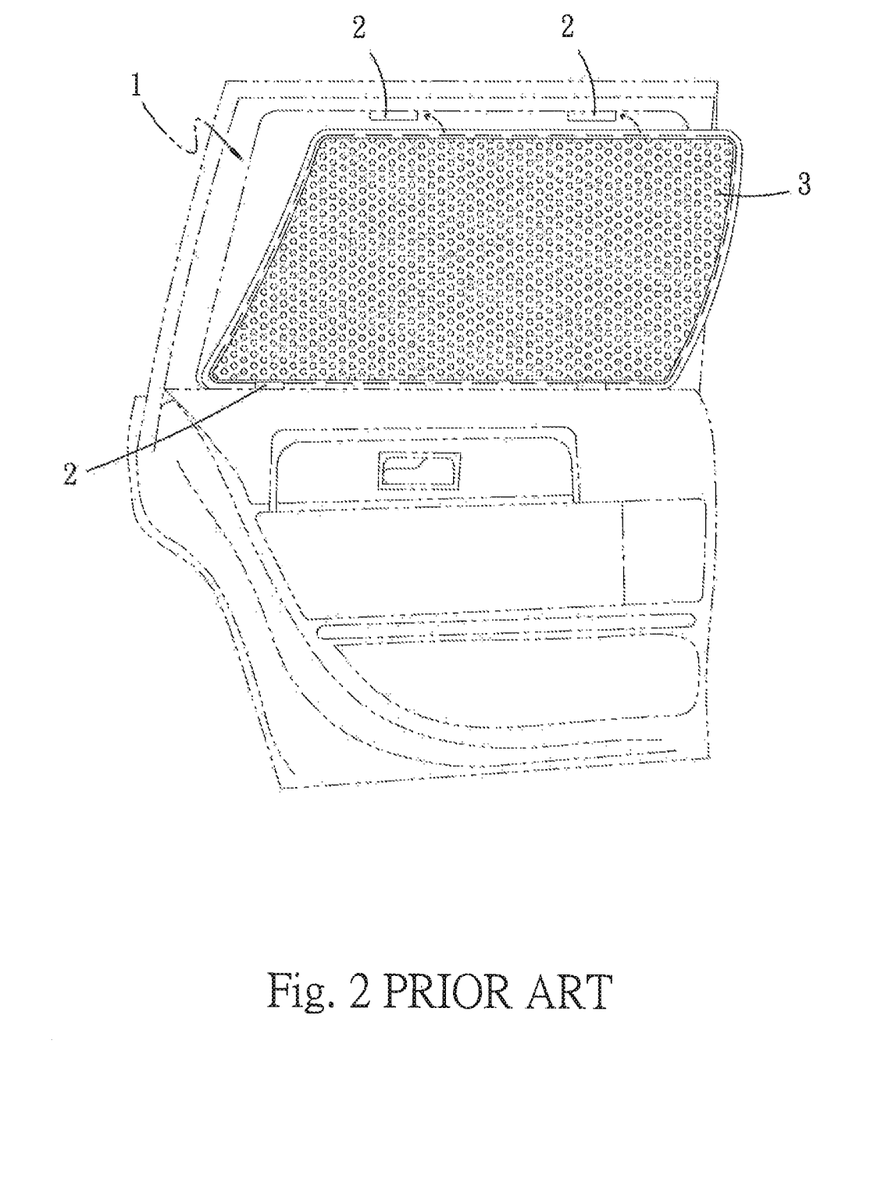
FIG. 2 is a schematic view of the sunshade holding structure of the first conventional. technique in an installation condition.

Applicant has proposed a novel shade assembly granted in U.S. Pat. No. 7,131,683 which includes a plurality of fastening blocks 2 each has an adhering layer 21 on the backside to attach to the top edge and bottom edge of a vehicle window frame 1, please refer to FIGS. 1 and 2. Each fastening block 2 has a holding zone 22 in the middle with a wider inner side and a narrower outer side to allow a flexible sunshade 3 to be wedged in flexibly for anchoring, thereby achieve the purpose of blocking sunshine projection. When in use the vehicle window can be opened without removing the sunshade 3. The sunshade 3 can be easily removed because of its flexibility. However, the flexible sunshade 3 has to be removed from the holding zone 22 of the fastening block 2. When used for a prolonged period of time the adhesive layer 21 bonded between the fastening block 2 and vehicle window frame 1 tends to loosen off, and adhesive residues are easily generated. Moreover, installation and disassembly of the sunshade 3 also take substantial time and labor.

Figure 3:
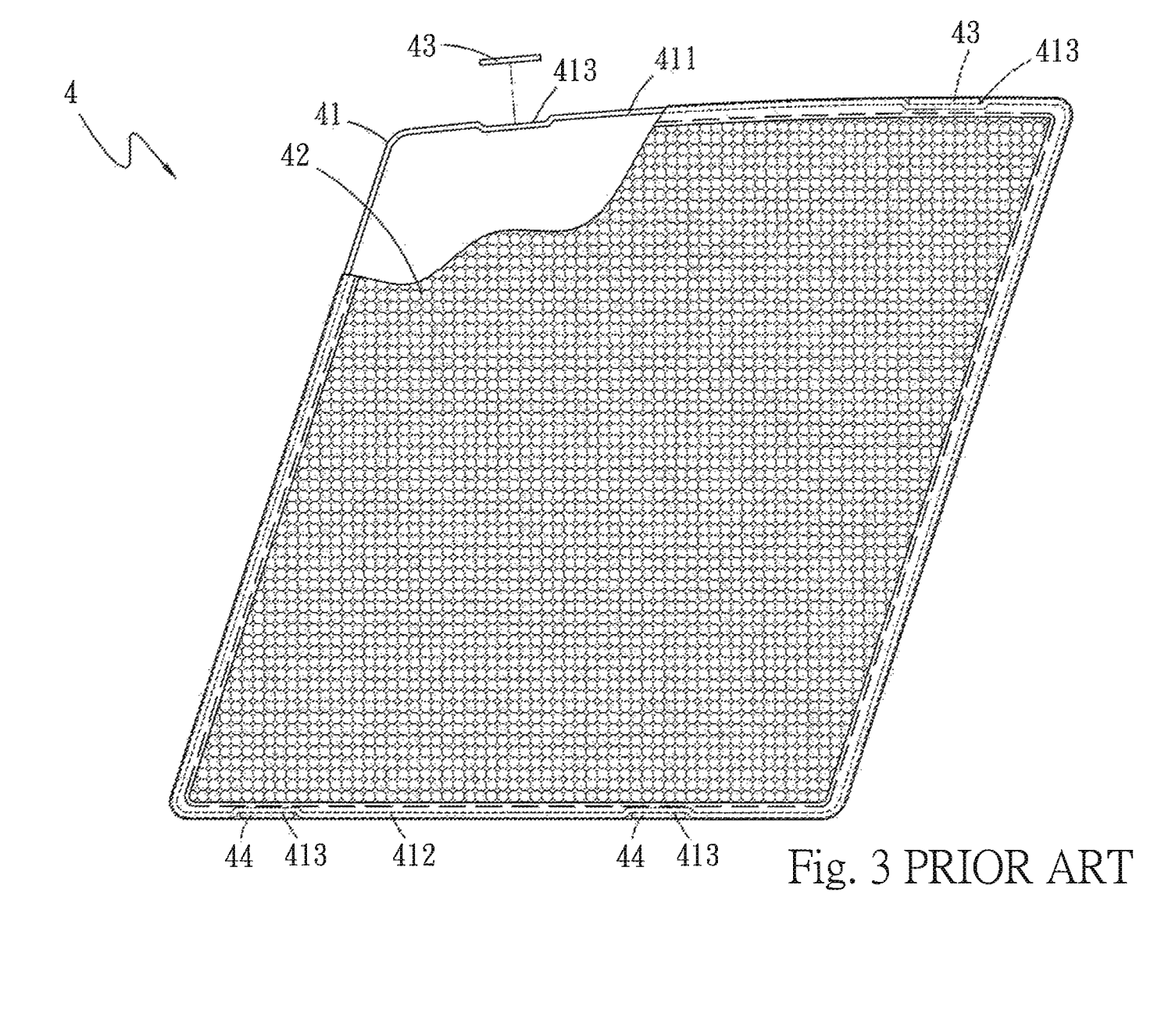
FIG. 3 is an exploded view of the window covering of a second conventional technique.
Figure 4:
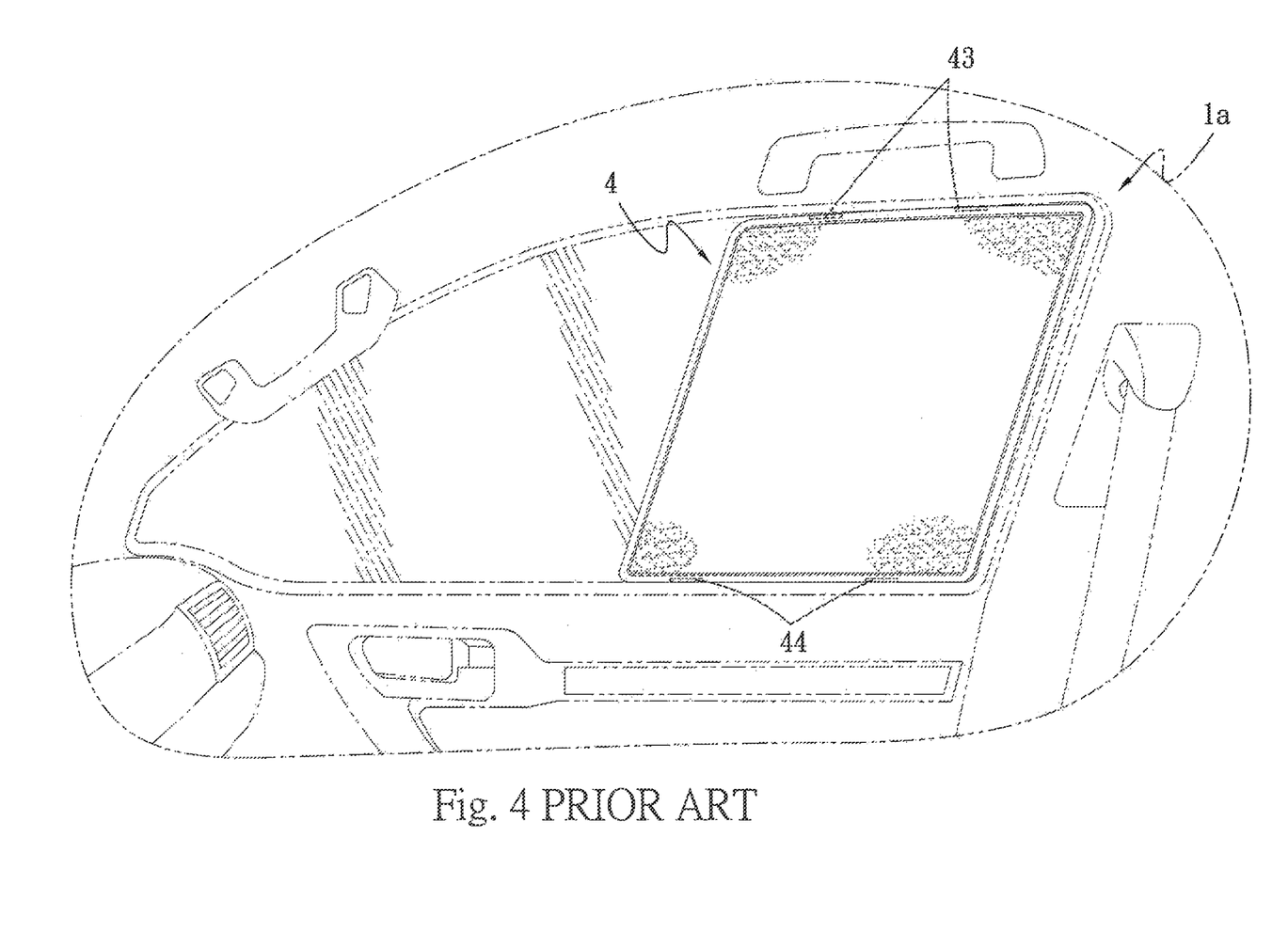
FIG. 4 is a schematic view of the window covering of the second conventional technique in an installation condition.

U.S. Pat. No. 8,365,799 discloses another type of window covering for vehicles. Its window covering 4 includes a casing 41, a panel 42, a first magnet 43 and a second magnet 44. The casing 41 includes a ferromagnetic material, and includes a first member 411 and a second member 412. The first and the second members 411 and 412 have respectively a hole 413. The first magnet 43 and second magnet 44 are magnetically attached to the respective hole 413 of the first member 411 and second member 412, and the panel 42 is attached to the first and second members 411 and 412, and covers the holes 413. The window covering 4, through the first magnet 43 and second magnet 44, is configured to be magnetically attached to the window frame 1a. During installation of the window covering 4, the first magnet 43 and second magnet 44 are attached respectively to the holes 413 of the first and second members 411 and 412; next, the panel 42 covers the casing 41 and the first magnet 43 and second magnet 44, and then is trimmed and sewed. But the first magnet 43 and second magnet 44 held in the holes 413 easily loosen off after used for a period of time and result in dropping from the panel 42 and sliding in position. This creates difficulty of positioning on the window frame 1. Moreover, fabrication process of the window covering 4 is more complex and the cost is higher.

In view of the drawbacks occurring to the aforesaid conventional techniques, there is still room for improvement on positioning of the sunshade.

SUMMARY OF THE INVENTION

The primary object of the present invention is to provide a sunshade holding structure to magnetically attract a sunshade through positioning members to an inner side of a vehicle window frame to block sunshine.

To achieve the foregoing object, the sunshade holding structure of the invention comprises a flexible frame, a sunshade cloth and at least one positioning member. The flexible frame has at least one notch on the circumference thereof. The sunshade cloth covers the flexible frame to form a sunshade. The positioning member has two flanges extended towards the sunshade, a latch groove formed between the flanges to latch on the notch of the flexible frame, and a housing compartment opposite to the latch groove to hold a magnetic element.

By means of the structure set forth above, the invention provides many advantages, notably:

1. The sunshade of the invention can be directly attached to the inner side of a vehicle window frame via the magnetic element of the positioning member to block sunshine. Both installation and disassembly can be done quickly and easily.

2. The positioning member of the invention is latched on the notch of the flexible frame and aligned with the circumference of the flexible frame to closely attach to the inner side of the vehicle window frame, hence can reduce the gap of sunshine projection.

3. The sunshade of the invention is fabricated by covering the sunshade cloth on the flexible frame first, and then latching the positioning member on the flexible frame. Compared with the second conventional technique mentioned above that has the first magnet and second magnet attracted respectively to the holes of the first and second members, and then the panel covers the casing and the first and second magnets and is trimmed and sewed, the invention provides a simpler fabrication process and can reduce the production cost. Moreover, the positioning member can be latched on the sunshade without sliding easily.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Please refer to FIGS. 5 through 6B and 8A, the present invention aims to provide a sunshade holding structure 6 which comprises a flexible frame 61, a sunshade cloth 62 and at least one positioning member 63.

Figure 5:
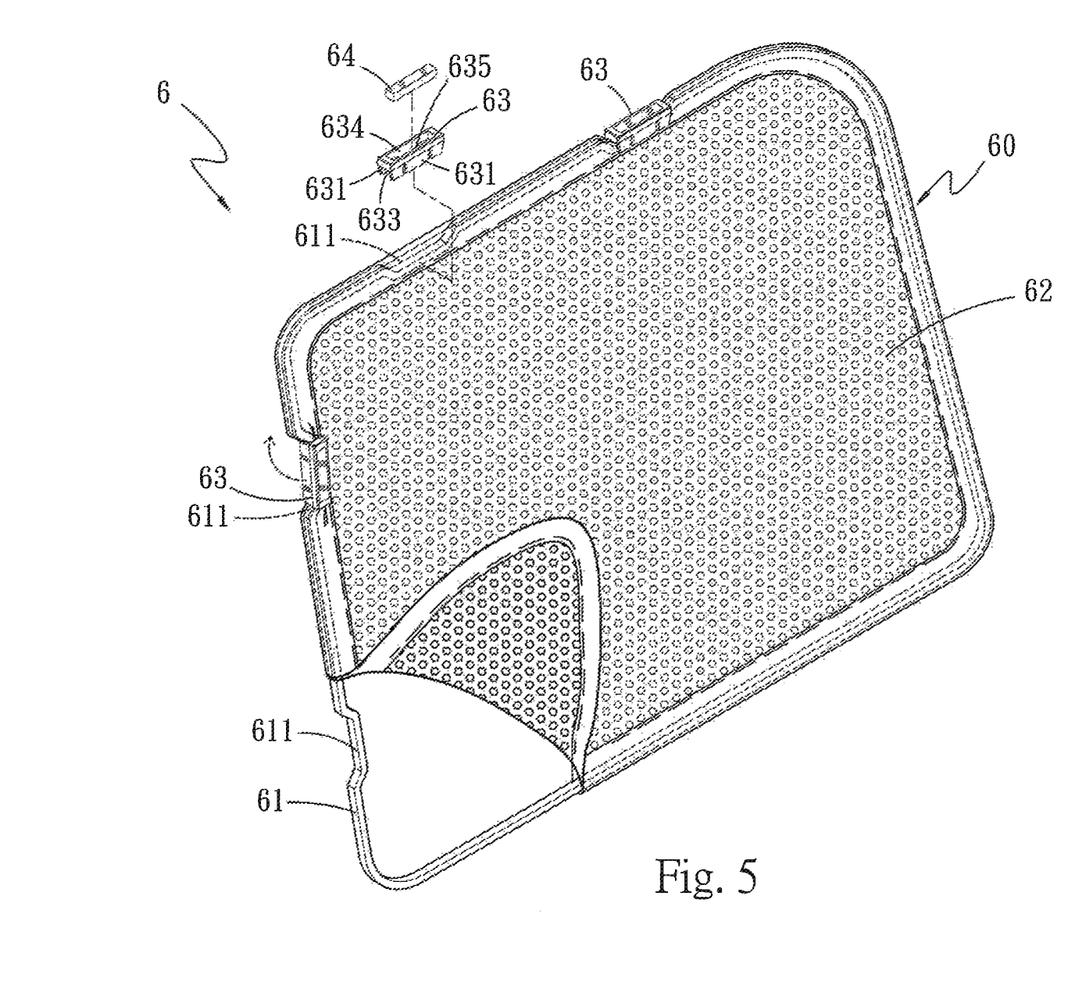
FIG. 5 is a schematic exploded view of the sunshade holding structure of the invention.

The flexible frame 61 is made of metal and can be bent correspondingly to a vehicle window frame 7. The flexible frame 61 has at least one notch 611 abutting the circumference of the vehicle window frame 7. In this embodiment, four notches 611 are formed.

The sunshade cloth 62 is formed in a same or different densities or in a mesh style, and has the circumference covering the flexible frame 61 and trimmed and sewed to form a sunshade 60.

Figure 6A:
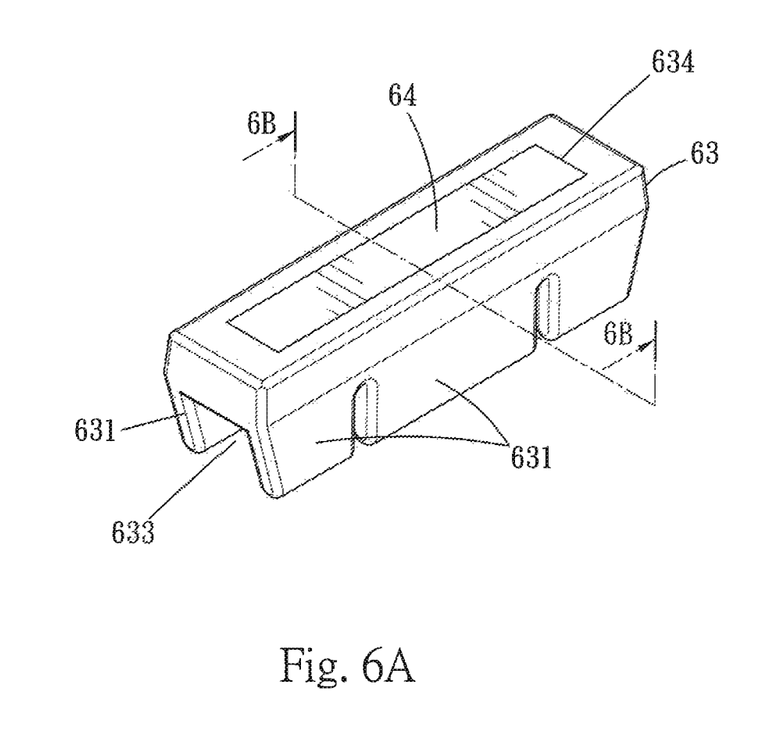
FIG. 6A is a perspective view of the positioning member of the invention.
Figure 6B:
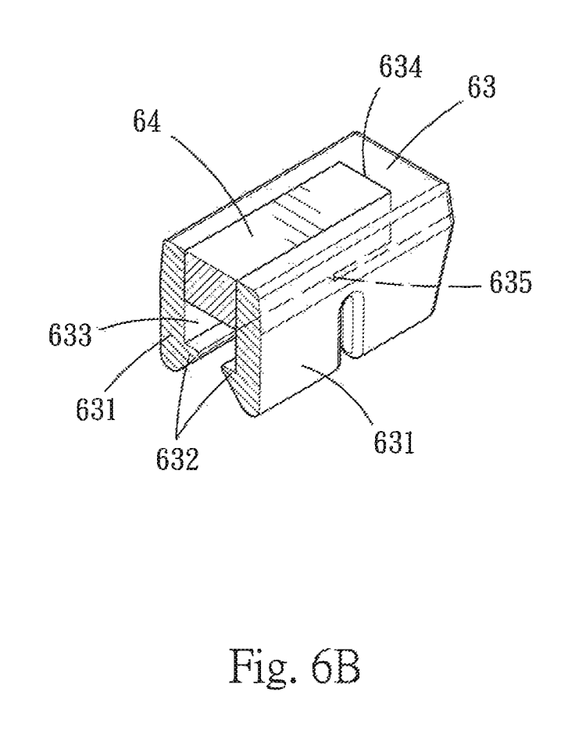
FIG. 6B is a cross section taken on line 6B-6B in FIG. 6A.
Figure 7A:
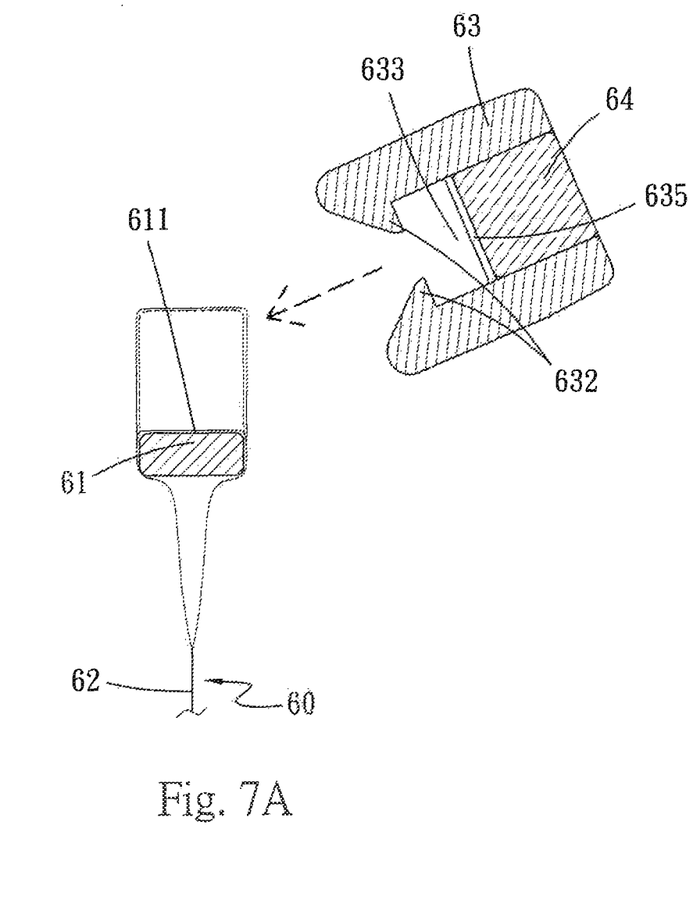
FIG. 7A is a schematic view of the positioning member of the invention wedging from an outer side of the sunshade.
Figure 7B:
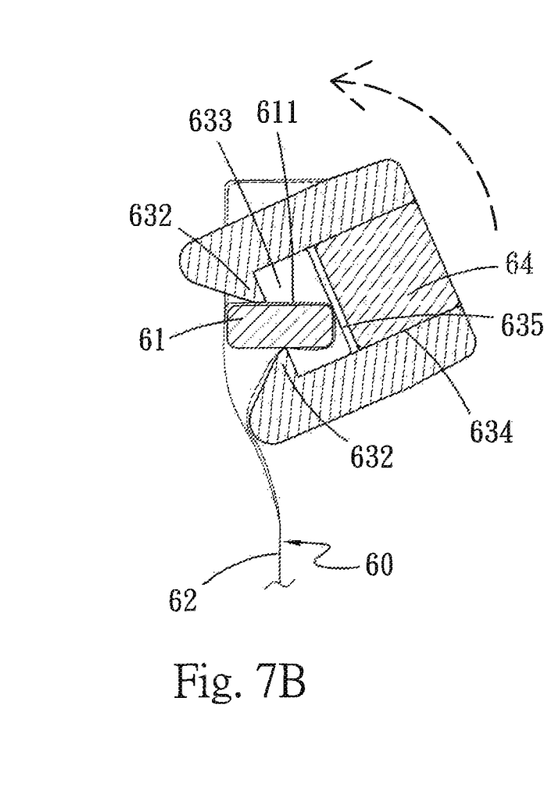
FIG. 7B is a schematic view of the positioning member of the invention wedging in the flexible frame.
Figure 7C:
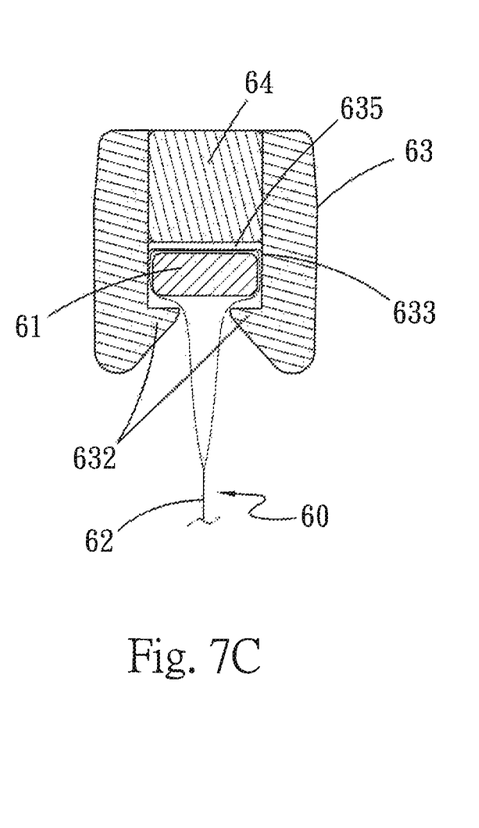
FIG. 7C is a schematic view of the positioning member of the invention latched on the flexible frame after turning.

The positioning member 63 is formed at a number corresponding to the notches 611. The positioning member 63 has two flanges 631 extended towards the sunshade 60 and a latch groove 633 formed between the two flanges 631. Each flange 631 has an inverse hook 632 at a distal end directing inwards. The positioning member 63 further has a housing compartment 634 opposite to the latch groove 633 and an opening 635 at the bottom of the housing compartment 634 leading to the latch groove 633. The housing compartment 634 holds securely a magnetic element 64 such as a magnet.

Figure 8A:
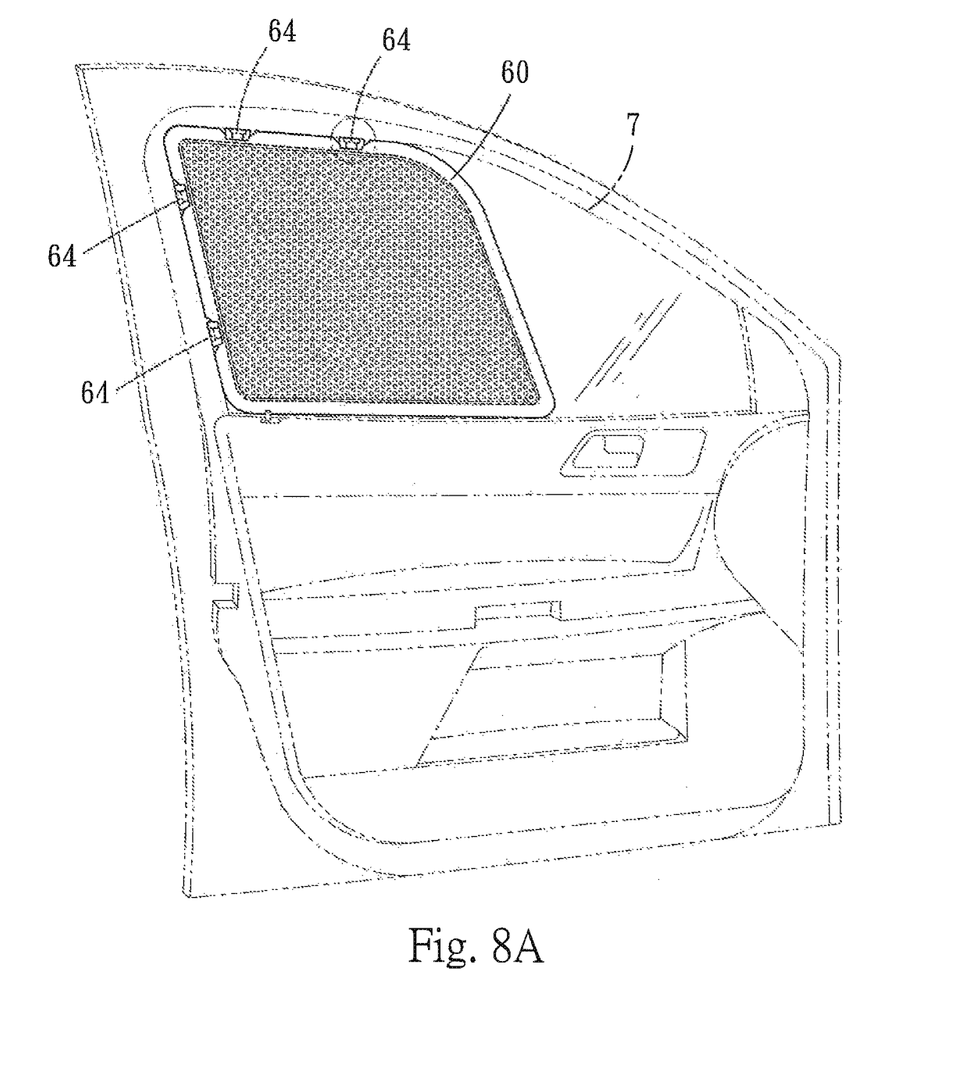
FIG. 8A is a schematic view of the sunshade of the invention installed on a vehicle window frame.
Figure 8B:
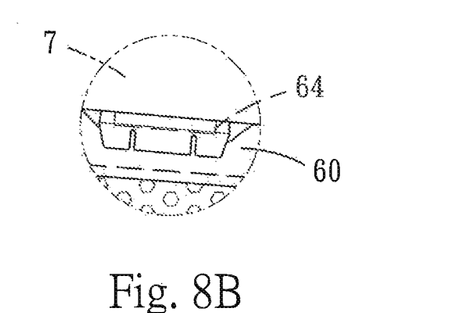
FIG. 8B is a fragmentary enlarged view of the magnetic element of the invention attracted magnetically to the vehicle window frame.

By means of the elements set forth above, for assembly when in use, the latch groove 633 of the positioning member 63 is latched on the outer side of the sunshade 60 in a tilted manner to couple on the notch 611 of the flexible frame 61 as shown in FIGS. 5 and 7A through 7C. Then, the sloped surface of the inverse hook 632 guides the positioning member 63 to turn so that the magnetic element 64 on the another side of the positioning member 63 is located at the outer side of the sunshade 60 and the sunshade cloth 62 and the covered flexible frame 61 are confined in the latch groove 633. Moreover, the elevation of the positioning member 63 latched on the notch 611 of the flexible frame 61 is aligned with the circumference of the flexible frame 61. In addition, the sunshade cloth 62 is wedged in the latch groove 633 with increased friction resistance during latching, therefore is less likely to be turned and loosen away. Furthermore, the flexible frame 61 in the latch groove 633 is attracted magnetically by the magnetic element 64 through the opening 635, hence the positioning member 63 can be securely held on the sunshade 60. In short, the sunshade 60 of the invention can be directly attached to the inner side of the iron vehicle window frame 7 through the magnetic element 64 as shown in FIGS. 8A and 8B to quickly and easily position the sunshade 60. When not in use it also can be removed easily.

Figure 9A:
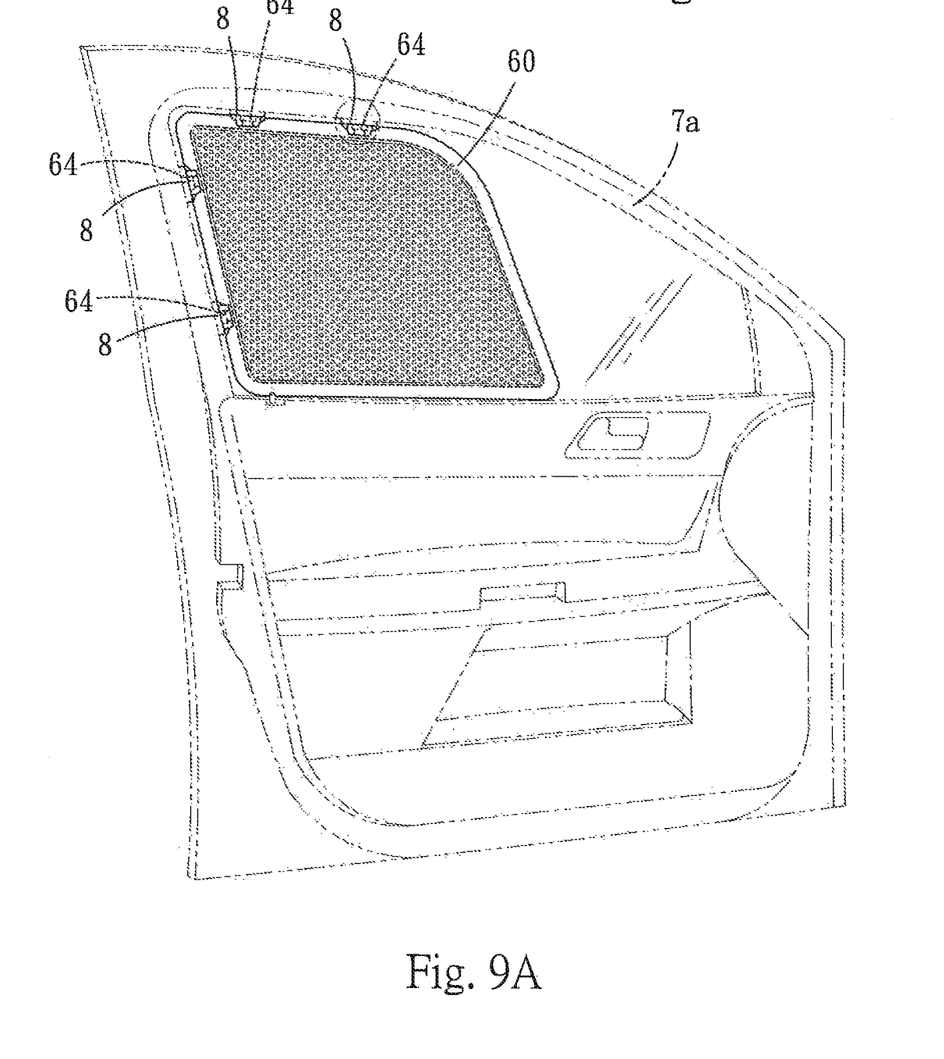
FIG. 9A is a schematic view of another embodiment of the sunshade of the invention installed on a vehicle window frame.
Figure 9B:
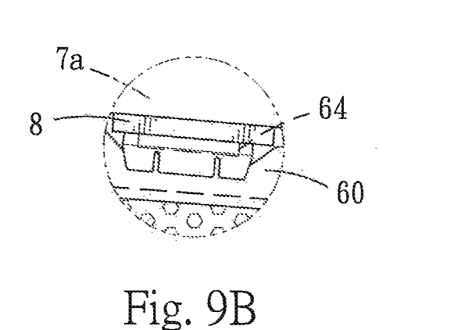
FIG. 9B is a fragmentary enlarged view of the magnetic element of the invention magnetically attracted to a metal plate according to FIG. 9A.

The sunshade 60 of the invention also can deployed on a vehicle window frame 7a made from plastics. Please refer to FIGS. 9A and 9B, a plurality of magnetic metal plates 8 can be provided and attached to the inner side of the plastic vehicle window frame 7a to generate magnetic attraction to the magnetic elements 64, thereby the sunshade holding structure 6 can be securely held at the desired position.

In short, in the invention, the sunshade cloth 62 first covers the flexible frame 61 and is trimmed and sewed to form the sunshade 60, and then the positioning members 63 are latched on the notches 611 of the flexible frame 61 of the sunshade 60. Compared with the second conventional technique mentioned above the invention can be fabricated simpler to reduce the production cost. Moreover, the positioning member 63 can latch on the sunshade 60 firmer without easily sliding away.

What is claimed is:

1. A sunshade holding structure, comprising:
a flexible frame including at least one notch on the circumference thereof;
a sunshade cloth covering the flexible frame to form a sunshade; and
at least one positioning member which is latched on the notch of the flexible frame and includes two flanges extended towards the sunshade to clamp the sunshade, a latch groove formed between the two flanges to accommodate the sunshade, and a housing compartment located at one side thereof remote from the sunshade to hold a magnetic element,
wherein an elevation of the positioning member latched on the notch of the flexible frame is aligned to the circumference of the flexible frame.

2. The sunshade holding structure of claim 1, wherein the two flanges respectively includes an inverse hook at a distal end directing inwards so that the inverse hooks of the two flanges face each other.

3. The sunshade holding structure of claim 1, wherein the sunshade cloth is formed in a same or different densities.

4. The sunshade holding structure of claim 1, wherein the positioning member includes an opening at the bottom of the housing compartment leading to the latch groove.

5. The sunshade holding structure of claim 1, wherein the magnetic element is a magnet.

6. The sunshade holding structure of claim 1, wherein the magnetic element of the positioning member is magnetically attracted to an inner side of an iron vehicle window frame.

7. The sunshade holding structure of claim 1 further including at least one metal plate attached to an inner side of a plastic vehicle window frame and magnetically attracted by the magnetic element of the positioning element.

* * * * *